United States Patent [19]

Hwang

[11] Patent Number: 5,802,391

[45] Date of Patent: *Sep. 1, 1998

[54] DIRECT-ACCESS TEAM/WORKGROUP SERVER SHARED BY TEAM/ WORKGROUPED COMPUTERS WITHOUT USING A NETWORK OPERATING SYSTEM

[75] Inventor: Ivan Chung-Shung Hwang, Santa Ana, Calif.

[73] Assignee: HT Research, Inc., Tustin, Calif.

[*] Notice: The term of this patent shall not extend beyond the expiration date of Pat. No. 5,550,892.

[21] Appl. No.: 539,066

[22] Filed: Oct. 4, 1995

Related U.S. Application Data

[63] Continuation-in-part of Ser. No. 522,835, Sep. 1, 1995, Pat. No. 5,530,892, which is a continuation of Ser. No. 33,160, Mar. 16, 1993, abandoned.

[51] Int. Cl.$^6$ ............................................. G06F 3/00
[52] U.S. Cl. ............ 395/822; 395/800.29; 395/800.09; 395/882; 395/885; 395/893; 345/168
[58] Field of Search ................................ 395/200, 182, 395/822, 750, 479, 500; 345/1; 364/470.4

[56] References Cited

U.S. PATENT DOCUMENTS

| | | | |
|---|---|---|---|
| 4,313,161 | 1/1982 | Hardin et al. | 395/478 |
| 4,897,801 | 1/1990 | Kazama et al. | 395/520 |
| 4,949,248 | 8/1990 | Caro | 395/200.09 |
| 4,965,560 | 10/1990 | Riley | 345/1 |
| 5,128,876 | 7/1992 | Ames et al. | 364/470.04 |
| 5,197,148 | 3/1993 | Blount et al. | 395/182.03 |
| 5,239,643 | 8/1993 | Blount et al. | 395/613 |
| 5,251,320 | 10/1993 | Kuzawinski et al. | 395/750 |
| 5,355,500 | 10/1994 | Konodou | 395/726 |
| 5,410,679 | 4/1995 | Lubold et al. | 395/500 |
| 5,446,841 | 8/1995 | Kitano et al. | 395/200.01 |
| 5,530,892 | 6/1996 | Hwang | 395/822 |
| 5,577,205 | 11/1996 | Hwang et al. | 395/200.01 |

*Primary Examiner*—Christopher B. Shin
*Attorney, Agent, or Firm*—Leonard Tachner

[57] ABSTRACT

A system of computers having team/workgroup features built in. A typical hardware component thereof is a unitary chassis of a regular single IBM-PC tower-chassis footprint, designed to house electronics for up to four personal computers, all operating on a single power supply. The unitary chassis provides interconnecting cable for connecting up to four corresponding display terminals and keyboards, which all can be located at other dispersed locations. Each such computer provides a communication/ device-sharing card, which may for example be a SCSI-II card providing data rate transfer at 10 Megabytes per second on a single SCSI-II cable. Furthermore, each computer comprises a CPU card and a monitor interface card, such as a VGA card. The invention is especially suited for configuration as a PC-based, multiple-CPU, multi-user workgroup system. Such workgroup systems are especially adapted for collaborative, multimedia and client-server computing for small workgroups. The capability is facilitated by use of direct-access team/workgroup servers, for example a CD-ROM server, a media server, a peer-to-peer server and a file server. The computers recognize these servers as direct-access local drives which are shared by the users in a transparent manner without the need for a complicated Network Operating System.

18 Claims, 16 Drawing Sheets

DIRECT-ACCESS TEAM/WORKGROUP SERVER SHARED BY TEAM/ WORKGROUPED COMPUTERS WITHOUT USING A NETWORK OPERATING SYSTEM

CROSS-REFERENCE TO RELATED APPLICATIONS

This application is a continuation-in-part of U.S. patent application Ser. No. 08/522,835 filed on Sep. 1, 1995 now U.S. Pat. No. 5,530,892 (issued Jun. 25, 1996) which is a continuation of application Ser. No. 08/033,160 filed Mar. 16, 1993 entitled "MULTIPLE COMPUTER SYSTEM", now abandoned.

BACKGROUND OF THE INVENTION

1. Field of the Invention

The present invention pertains generally to the field of personal computers and high-end workstation computers and more specifically to a PC-based multiple computer, multi-user workgroup system, wherein a single unitary chassis houses virtually all of the electronics for a plurality of personal computers, (TEAMMATES and TEAMHUB) the display monitors and keyboards of which can be located at dispersed locations for operation in a teamwork or workgroup environment. In an existing network environment, multiple PCs can be team/workgrouped in one location, having the display monitors and keyboards located at dispersed locations. In both scenarios, all workgrouped PCs, whether in one chassis or in multiple chassis, can directly access and share all the common devices, whether they are CD-ROM drives, disk drives, tape drives, etc., which can be housed in one chassis, (as TEAMCHASSIS), or multiple PC chassis, (as workgrouped-PC chassis), or in an additional external chassis. The workgrouped PCS and the common devices may all be linked by SCSI cable. The direct-access capability to all connected SCSI devices by each workgrouped PC is achieved by SCSI cards, plugged into each workgrouped PC and built-in with "TEAMBIOS". TEAMBIOS on each card provides each workgrouped PC the ability to recognize all connected SCSI devices during its system bootup, controls the access traffic to connected SCSI devices and communicates with other TEAMBIOS on other cards through locking mechanism "Semaphore" installed on TEAMHUB.

2. Prior Art

In a small team/workgroup environment, the most common way of connecting PCs is to use Ethernet, Token-Ring or the like and which provides the peer-to-peer connectivity between each PC. However, such a loosely coupled Ethernet or Token-Ring-based multiple PC setup is not capable of providing team/workgroup multimedia and collaboration. Each PC has to run a peer-to-peer Network Operating System (NOS) and designate itself either as a client or as a server or both. As for workgroup collaboration, if one PC acts as both a client and a server, then other PC's accessing the devices that have been mapped a network device by the host PC, will slow down the host PC performance. If there are more than one transaction, then the performance is degraded severely. If a PC is set up as a dedicated server, then it becomes a costly solution. In addition, the peer-to-peer NOS is not a full-fledged server NOS. As for multimedia, peer-to-peer network is too slow to sustain team/workgroup multimedia communications.

In a conventional enterprise-wide network environment, PCs are connected thru Ethernet, Token-Ring or the like, to a dedicated file-server than runs a client-server NOS. The wiring topology can be star-hub or daisy-chain. If the network is built on one Ethernet segment, then any communication between two PCs within a tight-knit team/workgroup, running a peer-to-peer NOS to achieve team/workgroup collaboration, will adversely affect the legitimate network traffic from other PCs to the file server. Even if the file server installed with several network interface cards so that each network interface card can be on one cabling segment, or using an intelligent hub or concentrator to screen network traffic, the team/workgroup collaboration can not be easily achieved without the use of a server's bridge capability. Still on the same segment, the team/workgroup collaboration generates unnecessary network traffic that adversely downgrade the overall network performance. Also, file-server is not capable of handling multimedia communications because the file server can only sustain two concurrent multimedia communications to target nodes. In multimedia communications between any two network nodes that belong to the same team/workgroup, the performance is bound to be less satisfactory and the overall network performance is degraded severely.

The current PC-based LAN is not suitable to run workgroup multimedia and workgroup collaboration because the PC-based LAN server is limited to keeping, at best, two concurrent full-motion multimedia up and running due to its NOS and network link overhead. Theoretically, the prevailing SCSI hard disk used in a server can provide only a maximum 1.2 Mbytes/sec random-seek throughput, which can sustain only four concurrent full-motion multimedia because each full-motion needs at least 300 KB/sec. The PC-based LAN server cannot accommodate every workgroup's intensive multimedia, collaborative and database sharing. If every workgroup wants to run its own groupware and share multimedia, collaborative and database applications on the LAN server, then the intensive sharing will create unnecessary heavy network traffic that adversely affects other workgroups' activities and abruptly brings the LAN server down to a halt. Team/workgroup servers are definitely needed to alleviate the LAN server's heavy load. In order to eliminate the unnecessary workgroup load imposed on the LAN server, the workgroup software (groupware) that provides workgroup multimedia, collaboration and database should be installed on the team/workgroup server instead of on the LAN server; Team/workgroup servers should be dedicated for collaborative workgroups. If workgroups are not defined based on job/function and are not physically arranged into collaborative workgroups, then the groupware that provides workgroup multimedia, workgroup collaboration and workgroup databases cannot run and be shared efficiently. The team/workgroup servers should not be NOS-based and should easily blend in with the existing LAN server. If team/workgroup servers are NOS-based, they will be slow and burdened with overhead. They are not easy to use and not fast enough to provide the collaborative workgroup with efficient multimedia, collaborative and database sharing. Also, they cannot co-exist well with the LAN server because they adversely affect each other and compete for the limited PC and network resources. The team/workgroup servers should be directly accessed by the collaborative workgroup without using the existing network. In so doing, the intensive workgroup multimedia and collaborative communication won't affect other workgroups' activities on the network and won't degrade the general network performance.

SUMMARY OF THE INVENTION

The present invention solves the aforementioned ongoing need by providing TEAMSERVER, a form of team/ workgroup servers, and workgrouped PCs, whether in one chassis or in multiple chassis, to upgrade existing PC-based LAN into a more productive team/workgroup-based LAN where workgroup multimedia, workgroup collaboration, and workgroup database/application sharing can be achieved without deficiency in an enterprise-wide environment.

The present invention also solves the ongoing need by providing TEAMSERVER and team/workgrouped PCs, whether in one chassis or in multiple chassis, to accommodate multiple users with a multimedia and collaborative network without resorting to an NOS in a small area, such as a typical small business office, retail store, restaurant or professional office environment, i.e. (Small Office Home Office "SOHO").

This invention provides a simple, fast and cost-effective direct-access team/workgroup servers to workgrouped PCs, whether in a single chassis or in multiple chassis, without using a complicated NOS. These direct-access team/ workgroup servers can be a CD-ROM TEAMSERVER, ideal for team/workgroup CD-ROM sharing, a Media TEAMSERVER, ideal for team/workgroup multimedia sharing, a peer-to-peer TEAMSERVER, ideal for team/ workgroup collaboration and a File TEAMSERVER, ideal for team/workgroup application/database sharing.

This invention provides a cost-effective way for implementing direct-access team/workgroup servers to upgrade an existing PC-based LAN into a more productive workgroup-based LAN, where workgroup multimedia, workgroup collaboration, workgroup application/database sharing can be achieved without any deficiency.

This invention provides workgrouped PC users with noiseless multimedia-ready PC workstations, transparent team/workgroup direct-access server fault-tolerance sharing and real-time audio/video team/workgroup conferencing.

The invention is especially suited for configuration as a PC-based, multiple-CPU, multi-user workgroup system. Such workgroup systems are especially adapted for collaborative, multimedia and client-server computing for small workgroups. The capability is facilitated by use of direct-access team/workgroup servers, namely, a CD-ROM server, a media server, a Peer-to-Peer server and a file server. The TEAMHUB and TEAMMATES recognize these servers as direct-access local drives which are shared by the users in a transparent manner without the need for a complicated Network Operating System.

These "Direct-Access" servers, housed either inside the TEAMCHASSIS or externally in a separate chassis or chassis and connected to the TEAMPRO computers through a SCSI-II cable, herein referred to as "TEAMSERVER", are only SCSI devices, (for illustration purposes, but not confined to SCSI), that can be boot-up recognized by each TEAMPRO computer, whether TEAMHUB or TEAMMATE, thru the specially designed BIOS drivers (Basic Input Output System drivers) residing on each SCSI-II card, herein referred to as TEAMBIOS.

Coupled with TEAMPRO in a team/workgroup environment, TEAMSERVER provides twice the performance compared to a NOS-based dedicated server due to its non-NOS simplicity and lack of network linkage overhead. There is no need to have an additional computer system that connects and controls all the SCSI devices, runs a complicated network operating system and then functions as a server to provide SCSI device accessibility to connecting workstations on a network through Ethernet, FDDI, and the like, in a team/workgroup environment.

TEAMSERVER can be installed with groupware solutions and application-server solutions that facilitate working together as a group and achieve workgroup collaboration and data-base sharing more effectively and productively. TEAMSERVER can also be installed with multimedia solutions that facilitate team/workgroup communications using text, color photos, video, voice and sound, spread sheet, document and achieve workgroup multimedia without degradation.

In an enterprise-wide environment, TEAMPRO, equipped with TEAMSERVER can be the network building block, creating a better network architecture where intensive local team/workgroup communications within the TEAMPRO doesn't affect other team/workgroups' activities, and doesn't generate unnecessary traffic that diminishes the general network performance.

Multiple personal computers housed in multiple chassis in an existing network environment can be grouped together as a functional team/workgroup at one location by using a SCSI cable to daisy-chain them and share TEAMSERVER directly without resorting to the existing network link, while their corresponding display terminals and keyboards can be located at dispersed locations. TEAMSERVER, within this setup and context, provides intensive team/workgroup multimedia, collaboration and coordination and reduces unnecessary traffic on the conventional network bus, i.e., Ethernet, FDDI and the like.

TEAMPRO is provided as a multi-PC team/workgroup platform so that within a single PC footprint, a single PC system can be expanded and transformed into a workgroup computer system.

TEAMPANEL is provided as a stand-alone switchable system control and system monitoring unit that provides real-time audio/video broadcasting and conferencing in a team/workgroup envionment. When equipped with TEAMPANEL, each TEAMPRO workstation becomes noiseless and multimedia-ready and can broadcast and communicate with other workstations through real-time audio, created by utilizing microphones and computer generated sound, that can be heard through headphone or speakers and real-time video that can be displayed on VGA monitors. In addition, each TEAMPRO workstation can take over the keyboard, serial ports and system-reset control of other workstations through a remote access port.

TEAMSERVER is provided as a multi-PC local team/ workgroup server that can enable workgroup multimedia and workgroup collaboration without any performance degradation. For example, when installed with a SCSI hard disk drive, TEAMSERVER can fully power four concurrent multimedia communications without any degradation, while the NOS-based dedicated server can only achieve two concurrent multimedia communications. If installed with a SCSI disk drive array, TEAMSERVER through-put is twice as fast as a conventional NOS-based server, whose performance is degraded because of its NOS overhead.

TEAMPRO and TEAMSERVER together provide a way of upgrading an existing PC-based LAN into a team/ workgroup-based LAN. TEAMPRO and TEAMSERVER are elements that create an improved network architecture where intensive multimedia and collaboration in a team/ workgroup doesn't affect other team/workgroups' activities. Therefore, the team/workgroup can have 100% availability of TEAMSERVER without any interference. Furthermore, the intensive communication within a team/workgroup doesn't create any unnecessary traffic on the conventional network, i.e., Ethernet, FDDI and the like, therefore, the network performance isn't degraded.

In one embodiment, the present invention, functioning as a multi-user workgroup system, comprises up to four CPU processors, each connected to a corresponding workstation up to 200 feet away. Each workstation, operating as a noiseless, stand-alone PC, comprises a monitor and a keyboard. Each workstation has built-in jacks for headphones/speakers and microphone. Each keyboard has 2 serial ports, a reset switch, a system-on indicator and a speaker. Three direct-access servers, namely, a CD-ROM server, a media/peer-to-peer/read-only server and a file server, reside on one CD-ROM drive and on a SCSI disk. These servers are accessed by each DOS/WINDOWS workstation as shared local drivers providing fast multimedia and application sharing for collaborative, multimedia computing without a network operating system.

OBJECTS OF THE INVENTION

It is therefore a principal object of the present invention to provide a PC-based, local area network computer system in which a single chassis may be used to house electronics for up to four personal computers in which multimedia and application sharing is accomplished using direct-access servers.

It is in additional object of the present invention to provide a multiple-user, PC-based TEAMWORK workgroup computer system for small areas, such as up to 20,000 square feet, in which a plurality of users at different work station locations therein, each has a monitor and keyboard connected to a central TEAMCHASSIS, the latter housing the central processing unit for each of the computer work stations.

It is still an additional object of the present invention to provide a multiple-user, PC-based workgroup computer system comprising a TEAMHUB computer and a plurality of TEAMMATE computers and further comprising a TEAMPANEL to allow the TEAMHUB user to switch the monitor display and keyboard operations of any of the TEAMMATE computers into the TEAMHUB for supervision and control.

It is still an additional object of the present invention to provide a PC-based, multi-user, computer system, wherein a single chassis houses the electronics for a plurality of computers which operate on a single, shared power supply, thereby increasing the operating efficiency of the entire system.

It is still an additional object of the present invention to provide a multiple computer system with a centrally located TEAMCHASSIS, providing high data transfer between the computers, as well as shared power supply, floppy disk drives, CD-ROM and tape backup and other device and application sharing, yielding a significant increase in performance and concurrent reduction in cost.

It is still an additional object of the invention to provide an improved multi-computer, multi-level architecture providing an increased data rate transfer communication workgroup link to reduce unnecessary network traffic.

It is still an additional object of the invention to provide an improved multi-computer workgroup system which may be integrated with existing personal computer systems.

It is still an additional object of the invention to provide an improved multi-computer system which provides improved collaborative, multimedia computing for workgroups without requiring a network operating system.

BRIEF DESCRIPTION OF THE DRAWINGS

The aforementioned objects and advantages of the present invention, as well as additional objects and advantages thereof will be more fully understood hereinafter, as a result of a detailed description of a preferred embodiment thereof, when taken in conjunction with the following drawings in which.

DETAILED DESCRIPTION OF PREFERRED EMBODIMENTS

Figure 1:
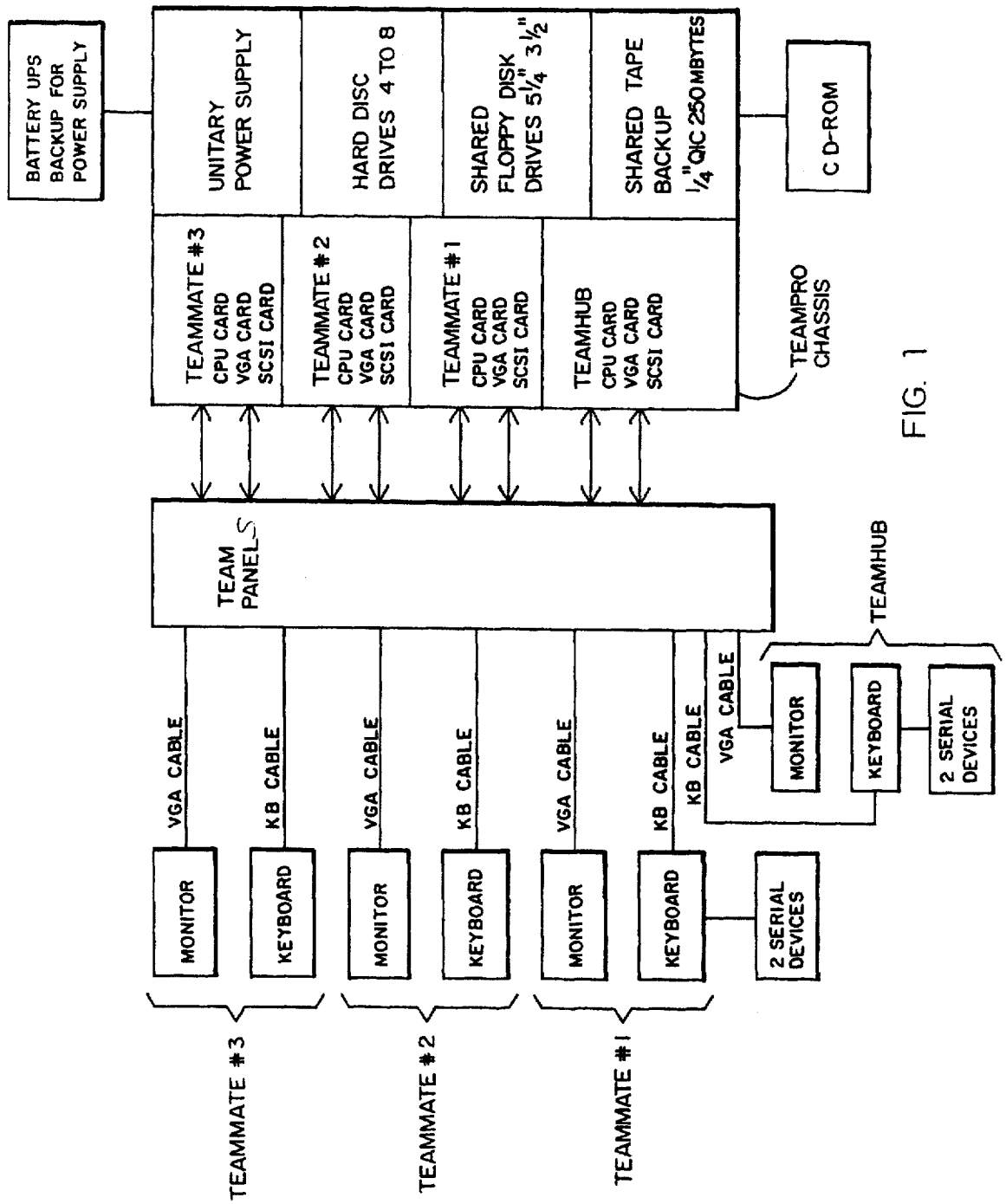
FIG. 1 is a block diagram of a team/workgroup system for up to four users in accordance with the present invention.

Referring now to FIG. 1, it will be seen that one preferred embodiment of the present invention comprises a TEAMPRO chassis 10 and four sets of monitors 12 and keyboards 14 connected to the chassis through a TEAMPANEL. Each individual combination of monitor and keyboard corresponds to one personal computer or PC. One such computer is referred to herein as the TEAMHUB and the remaining such computers are referred to herein as TEAMMATEs. As shown in FIG. 1, there is one TEAMHUB and three TEAMMATEs, namely TEAMMATE 1, TEAMMATE 2 and TEAMMATE 3. Except for the monitor and keyboard for each such computer, all of the electronics for each such computer are contained in the unitary TEAMPRO chassis which comprises a CPU card, VGA card and SCSI card for each of the corresponding monitors and keyboards. Thus, there is such a three card set for the TEAMHUB and such a three card set for each of the TEAMMATEs. The TEAMPRO chassis also comprises a unitary power supply 15 to provide electrical power for all of the electronics contained within the TEAMPRO chassis. An externally connected battery back-up UPS 16 is also provided as an option. Also housed within the TEAMPRO chassis are from four to eight hard disk drives 18 and two floppy disk drives 20 comprising a 5¼ inch floppy disk drive and a 3½ inch floppy disk drive. Also included in the TEAMPRO chassis is a shared tape back-up 22¼ inch QIC type with 250 megabytes capacity. A compact disc read only memory 24 (CD-ROM) or other SCSI devices may also be internally or externally connected to the TEAMPRO chassis.

There are two lines or cables connected to each TEAMMATE computer electronics and to the TEAMHUB computer electronics that extend externally of the TEAMPRO chassis. One such cable for each computer is the VGA monitor cable 25 and the other such cable for each computer is the keyboard cable 27. All eight of these cables pass through a switching mechanism hereinafter referred to as the "TEAMPANEL" 26 the function and operation of which will be more fully disclosed hereinafter. Each VGA cable is connected to a display monitor and each keyboard cable is connected to a corresponding keyboard located adjacent to the corresponding display monitor. Each such monitor and keyboard combination may be spaced from the TEAMPRO chassis by as much as 150 feet in the preferred embodiment. Each keyboard provides an IBM type standard keyboard format with the addition of two serial ports. Consequently, each keyboard cable comprises 26 lines. Four such lines are for keyboard operation, eight lines are for each serial port and there are six control lines, including for example, a speaker line, a hard disk indicator line and a reset line. This 26 line cable is connected to a remote access port in the CPU card corresponding to the TEAMHUB or to one of the TEAMMATEs. The connection to the monitor, by means of a VGA monitor cable, emanates from a VGA card in the computer electronics for each such computer system. The VGA card is also located in the TEAMPRO chassis.

Each CPU card in the TEAMPRO chassis can be any of the following CPUs, Pentium, 486DX Series and 486SX series and the like. In a typical preferred embodiment of the four computer version of the invention such as that shown in FIG. 1, the TEAMHUB CPU card is a 486DX CPU and each of the TEAMMATE CPU cards comprises a 486SX CPU. Each such CPU card has four megabytes of memory standard, but can have as much as 64 megabytes of memory. In addition, each such CPU card has a built-in disk controller with connections for connecting to one or two hard disk drives. Thus, one or two hard disk drives may be assigned for use with each computer, that is the TEAMHUB and each of the three TEAMMATEs.

One of the advantages of the present invention is that it may be initially obtained with any number of computers from one to four and, if it has initially less than four computers, it may be upgraded at any time to increase the number of computers up to four. Thus for example, the present invention may initially be obtained with only a TEAMHUB computer and later upgraded as need requires to add one, two or three TEAMMATE computers. Within the TEAMPRO chassis, there are two TEAMSLOT boards for interconnecting the VGA, CPU and SCSI cards internally. There is one such teamslot board for the TEAMHUB which provides ten slots and a second such TEAMSLOT board for all three TEAMMATEs which provides twelve slots. The twelve slot TEAMSLOT board for the three TEAMMATE computers provides four slots for each computer, one slot for the CPU card, one slot for the VGA card and one slot for the SCSI card and one extra slot for one optional additional card, such as for example a multimedia card. In the TEAMSLOT board for the TEAMHUB computer, there are nine extra slots, two of which are for network sharing and seven of which are for future expansion.

As previously indicated, each keyboard of the present invention provides two serial ports, each such serial port provides direct keyboard connection to any form of serial data operated device, such as a modem, a mouse, a card reader or printer.

The TEAMPANELs comprise a plurality of VGA monitor and keyboard switches, respectively. The TEAMPANELs are normally located adjacent to the TEAMHUB computer so that the TEAMHUB operator, using the TEAMPANEL switches, can display on his monitor any display currently on any of the TEAMMATEs. In addition, the TEAMHUB operator, by using the TEAMPANELs, can assume control over any TEAMMATE keyboard. Thus, the TEAMPANELs of the present invention provide an excellent and highly advantageous means for supervisorial or instructional scenarios as well as built-in computer backup for each TEAMMATE computer.

Figure 2:
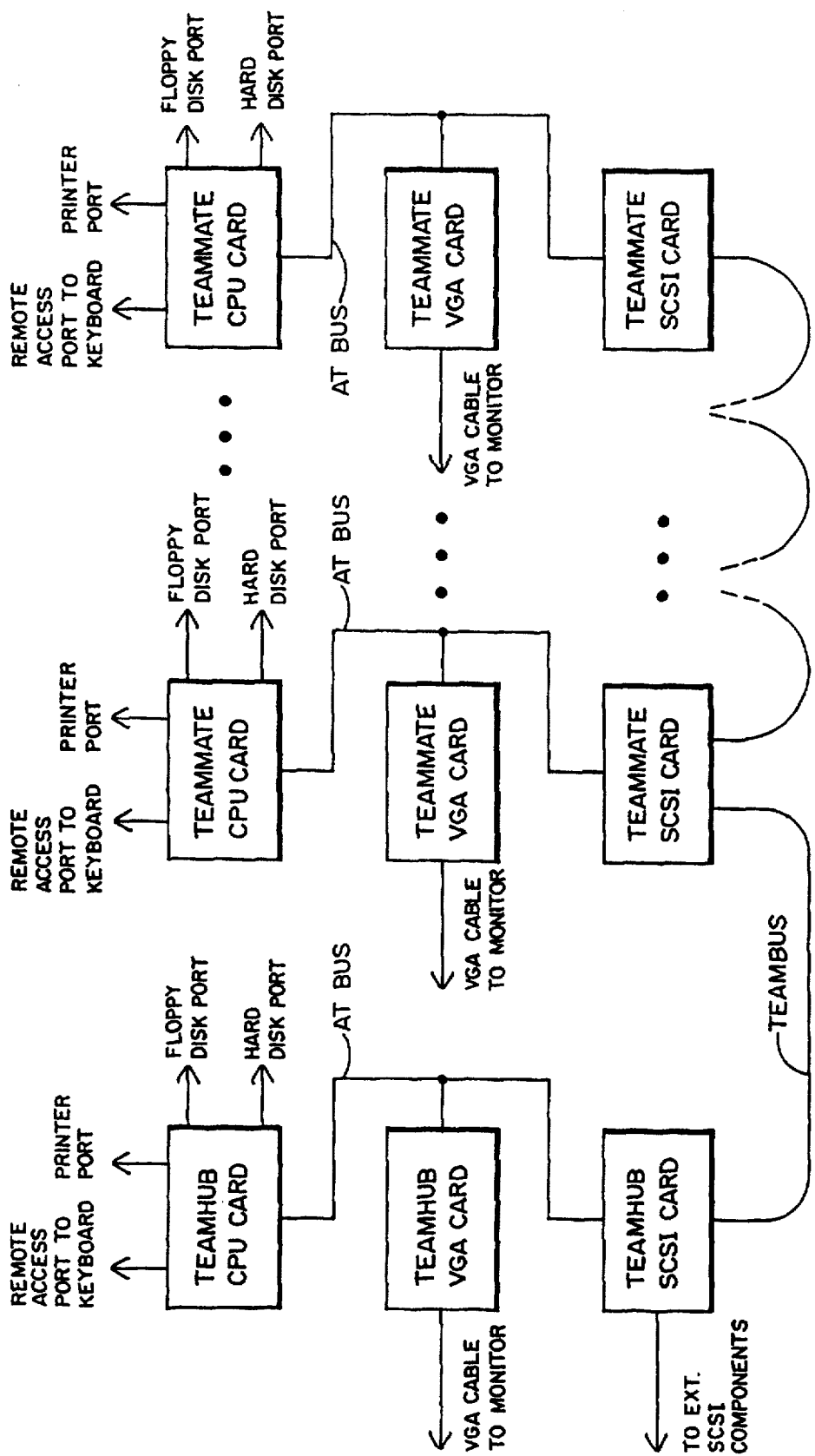
FIG. 2 is a block diagram of the TEAMCHASSIS used in the present invention.

Referring now to FIG. 2, it will be seen that within the TEAMPRO chassis, each computer comprises a CPU card 30, VGA card 32 and SCSI card 34 which are interconnected by means of the corresponding TEAMSLOT boards. In addition, the various SCSI cards of the respective computers are interconnected in a daisy chain configuration to form an SCSI bus or TEAMBUS for high speed communications between the respective computers. Current SCSI communication data rates are as high as ten megabytes per second which is currently at least eight times faster than Ethernet, the current data communications standard for peer-to-peer workgroup environments. Furthermore, the SCSI TEAMBUS permits external connection of other SCSI devices such as the CD-ROM shown in FIG. 1 or an extremely high capacity SCSI tape backup or hard disk subsystems. Up to four external SCSI devices can be connected by means of the SCSI TEAMBUS of the present invention. As seen further in FIG. 2, each computer's CPU card provides a remote access port for connecting the CPU directly to the keyboard, preferably through the TEAMPANELs shown in FIG. 1. Each CPU card also provides a separate printer port thus permitting printers to be connected directly to the TEAMPRO chassis. Each CPU card also provides its own hard disk port and its own floppy disk port. As also seen in FIG. 2, the VGA card of each computer provides a connection by means of a VGA cable to the corresponding monitor.

Figure 3:
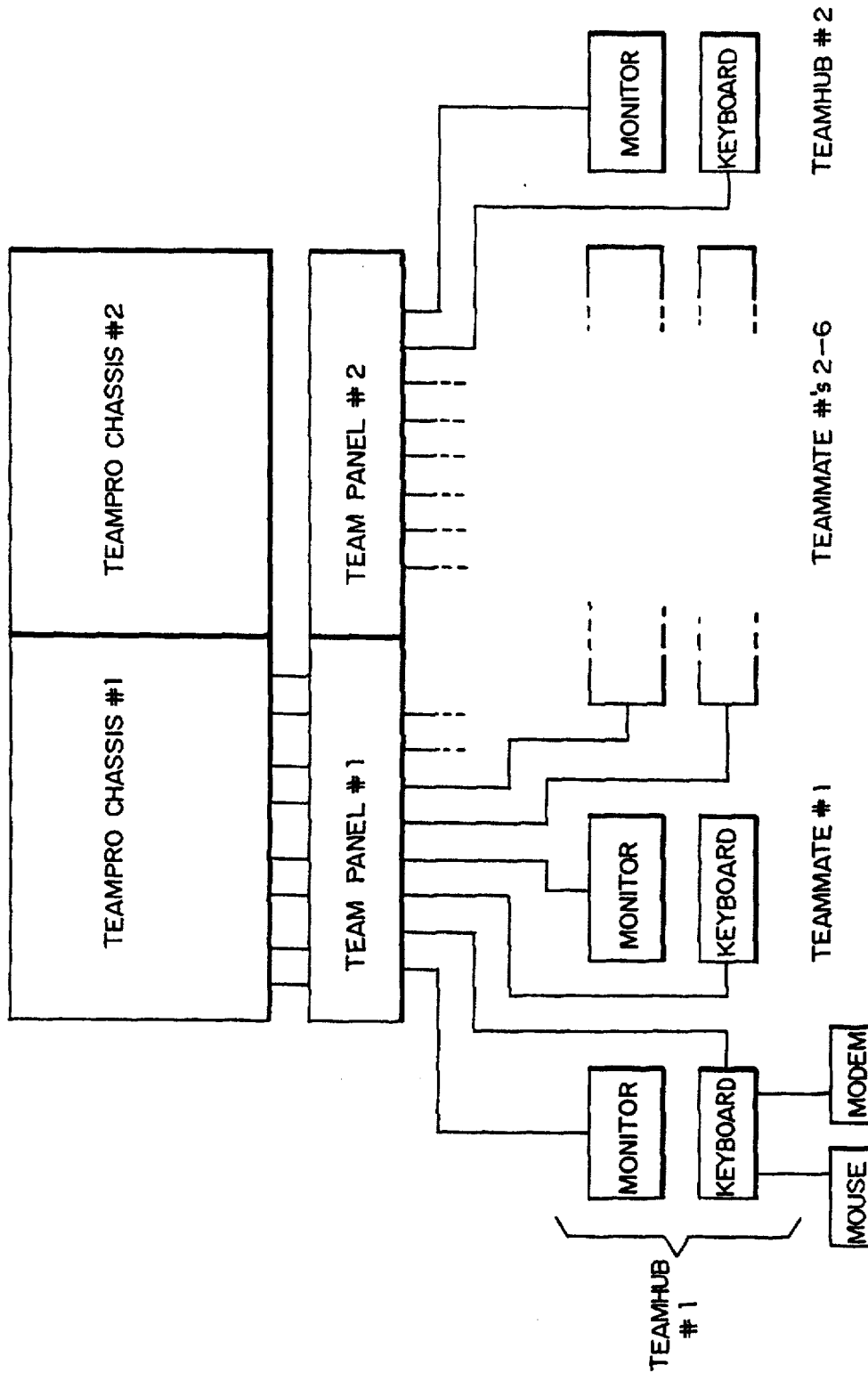
FIG. 3 is a block diagram of a dual chassis configuration of the present invention.

The SCSI TEAMBUS of the present invention also permits two separate TEAMPRO chassis 10a and 10b to be interconnected to form an expanded TEAMPRO workgroup system for up to eight users. Such a configuration is shown in block diagram form in FIG. 3. In this configuration, two TEAMPRO chassis are electrically interconnected by means of the SCSI teambus, thus providing a system with two TEAMHUB computers and up to six TEAMMATE computers, each having its own corresponding display monitors and keyboard of the type previously described. Each of the computers in the two TEAMPRO system of FIG. 3 may be identical to that already described for the single TEAMPRO configuration of FIG. 1. Thus, in this expanded system of FIG. 3, each CPU card may comprise a Pentium, a 486DX series CPU, a 486SX series CPU or the like. In addition, the system may be initially obtained with a reduced number of computers and subsequently expanded to a total of eight.

One of the most important considerations faced by systems designers is how to add a diverse selection of peripherals to a microcomputer system without sacrificing speed and performance. The solution currently being implemented by many OEMs is to use the Small Computer Systems Interface (SCSI) which is a typical peripheral bus. SCSI has become virtually a de facto industry standard because it is the only intelligent I/O interface that can be expanded and changed without affecting existing device driver software or interface hardware. SCSI is based on the same architecture as the block-multiplex channel found in large IBM mainframe systems. Because of features such as device independence, high bus bandwidth and an improved bus arbitration, the flexibility and power of SCSI is suited to today's powerful microcomputers, and for future systems as well. While performance and data integrity are very important, it is the unparalleled flexibility to integrate a wide variety of peripherals across several platforms that has made SCSI the system designer's choice. Since SCSI provides for logical rather than physical addressing, it allows the system software to be independent of the particular peripheral device on the host adapter. Device size and even type can be modified or added to the SCSI bus with virtually no change in the system. Expansion or upgrading of the I/O system is simplified with the SCSI bus because of the logical independence at the host. Since the host sees the same interface, the native drive interface is transparent to the system hardware and operation system, thus minimizing design time during expansion. The SCSI specification is officially defined by the American National Standards Institute (ANSI) document ANSI X3.131-1986. The standard was approved by the ANSI and is available to the public. SCSI specifications are also evolving to provide greater performance—the newest extension being SCSI-2. SCSI-2 features bus bandwidth increases to a 16- or 32-bit wide bus and increased data transfer rates to 10 Mbytes/sec, made possible by the latest SCSI chips and by tightening bus timing.

Figure 4:
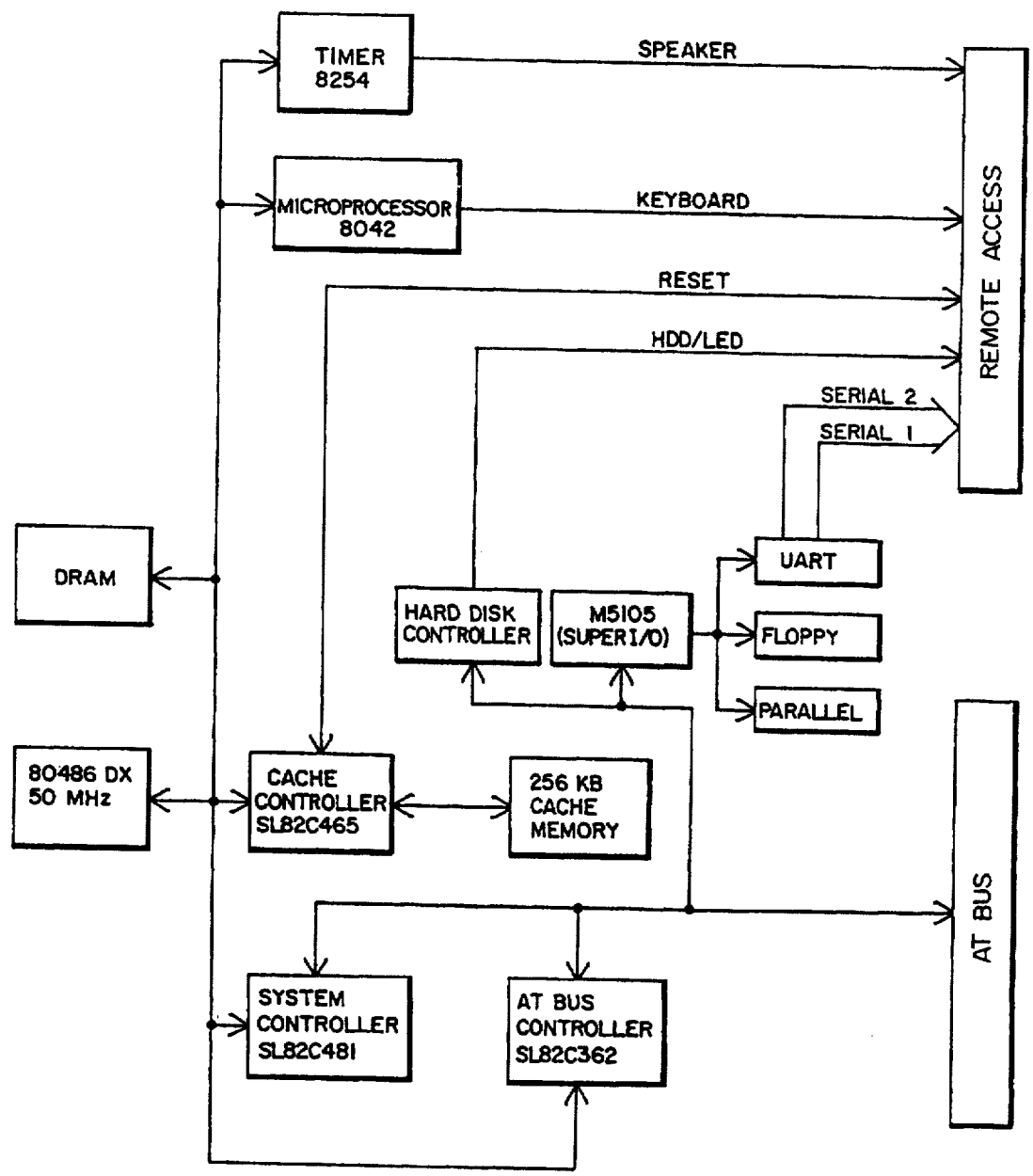
FIG. 4 is a schematic drawing of the CPU card of the present invention.

Referring now to FIG. 4, it will be seen that a CPU card of the present invention comprises a selected CPU chip, such as an 80486 DX 50 megahertz CPU chip with attendant cache memory of 256 kbytes and associated CPU and cache controller such as a Model SL82C465 and its associated random access memory of 16 megabytes. The CPU card of the present invention also comprises a system controller such as a Model SL82C461 and a bus controller such as a Model SL82C362 AT Bus Controller. All such SL model intergrated circuit devices are available from Symphony Laboratories, Inc. Furthermore, it will be seen in FIG. 4 that each CPU card includes a hard disk controller and an ACER Model M5105 Super Input/Output interface incorporating a universal asynchronous receiver/transmitter, a floppy disk controller and a parallel data port. AT bus protocol is described in Volume I of the Technical Reference of the IBM Personal Computer Hardware Reference Library, revised edition published in 1984.

Figure 5:
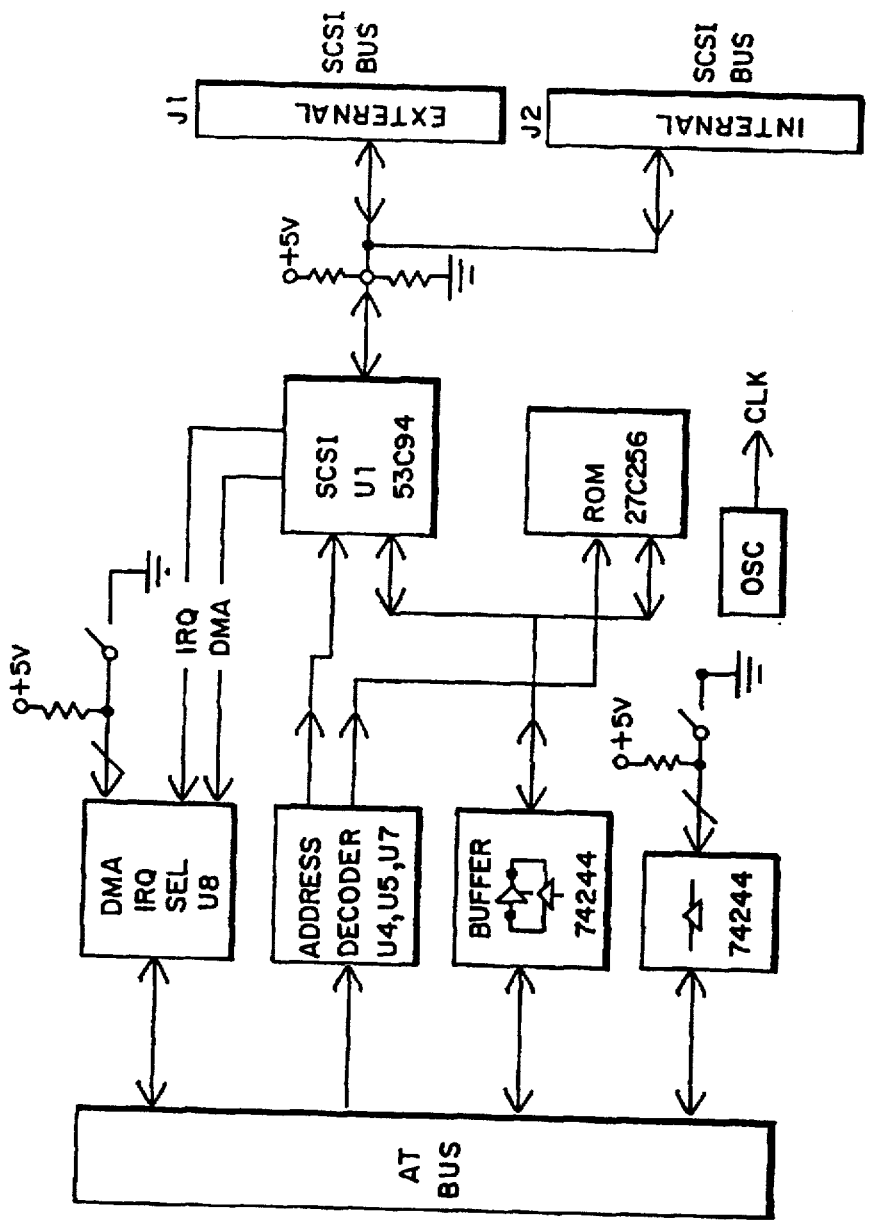
FIG. 5 is a schematic diagram of the SCSI card of the present invention.

Referring now to FIG. 5, it will be seen that a TEAMWORK CARD of the present invention comprises a Model 53C94 SCSI interface chip, a Model 27C256 read only memory, a direct memory access and interrupt request selection interface chip, a plurality of address decoders connected to the SCSI chip and the read only memory chip and a plurality of buffer interface units. The direct memory access and interrupt request selector, address decoders and buffers are all connected to the AT bus for interface with a CPU card. Each such SCSI chip may be obtained from EMULEX Corporation of Costa Mesa, Calif. The SCSI interface chip is connected to two SCSI bus interface connectors which provide the daisy chain connectors for the TEAMBUS interconnecting TEAMMATEs and TEAMHUB within the TEAMPRO chassis.

The VGA card of the present invention may be a standard, commercially available VGA card such as a Prisma VGART 1280I, which is commercially available from PRISMA Corporation and therefore need not be disclosed herein in any detail. This commercially available VGA card supports any advanced high performance VGA monitor and displays high resolution 1024×768 and 800×600 graphics in interlaced and non-interlaced modes and 1280×1024 graphics in interlaced mode.

Figure 6:
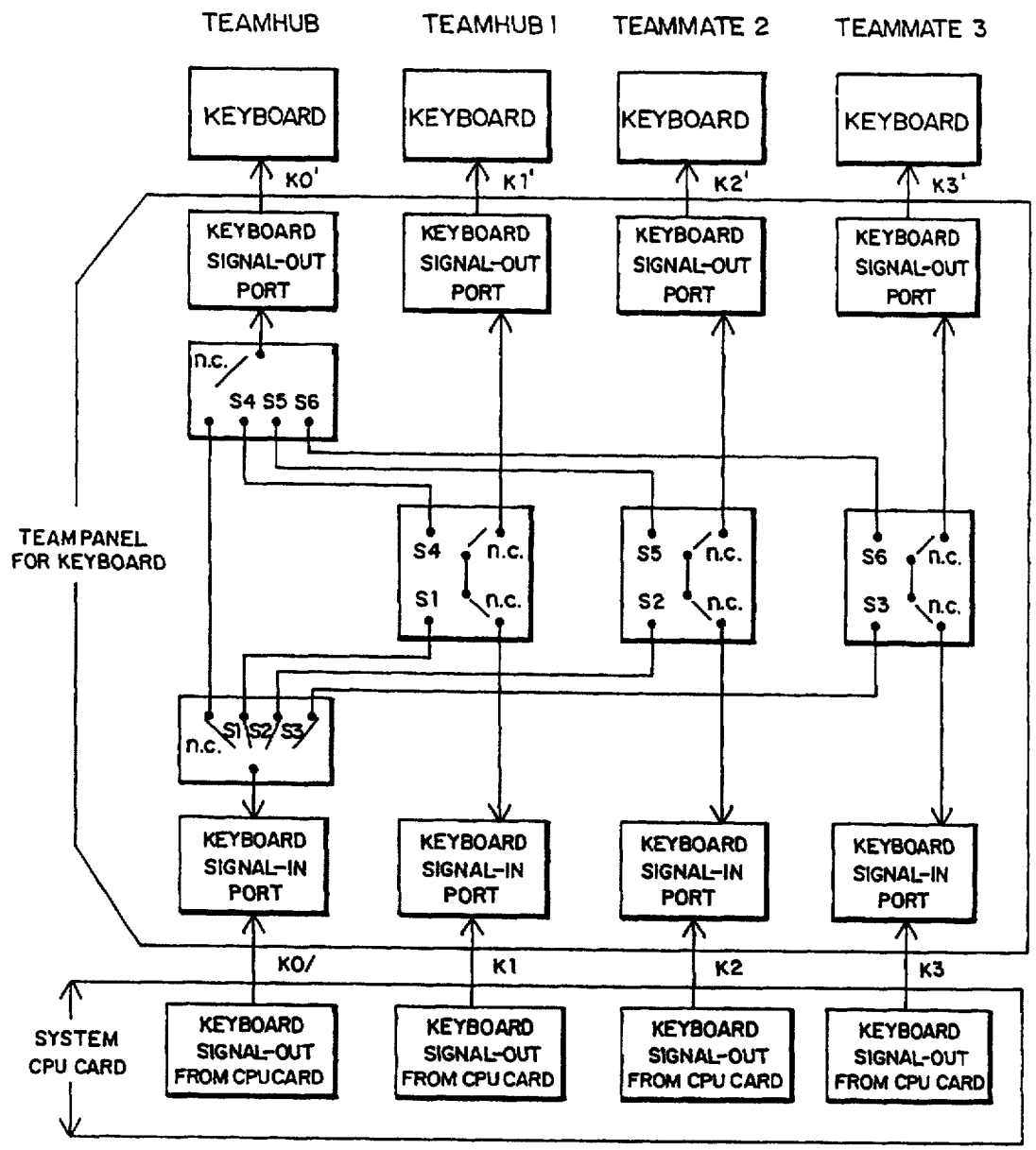
FIG. 6 is a schematic diagram of the TEAMPANEL of the present invention for keyboard switching.
Figure 7:
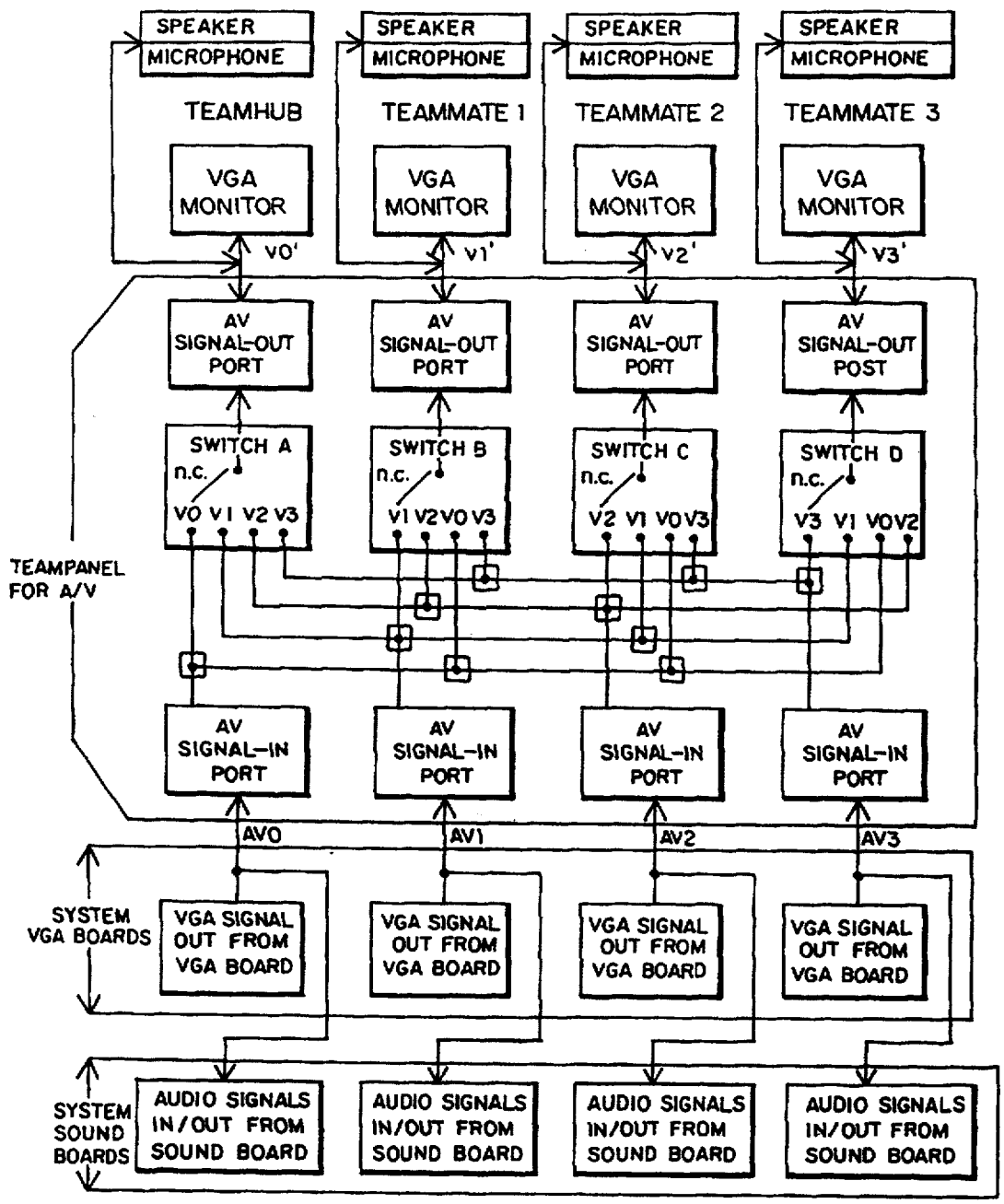
FIG. 7 is a schematic diagram of the TEAMPANEL of the present invention for audio/video switching.
Figure 8:
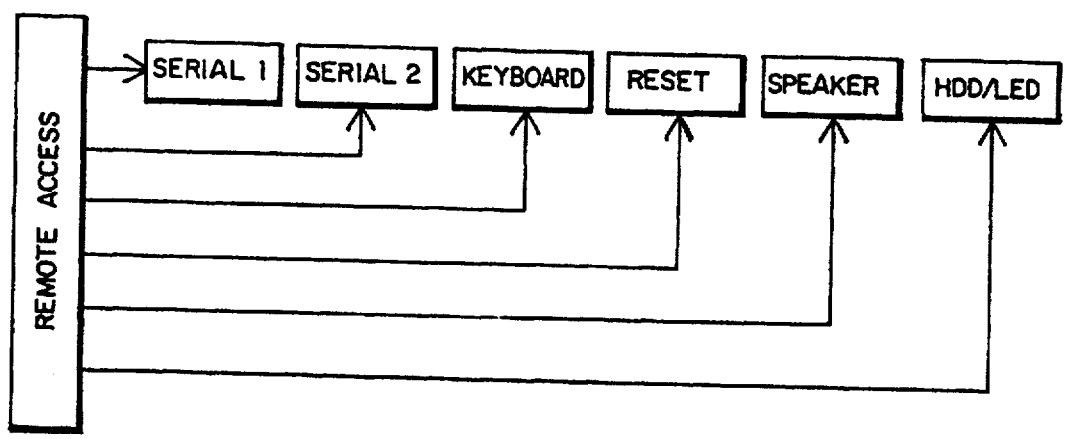
FIG. 8 is a block diagram of the keyboard of the present invention.

The TEAMPANEL of the present invention is shown in FIGS. 6 to 11. FIG. 6 illustrates the TEAMPANEL switching configuration for switching remote-access port signals of up to three TEAMMATES to the TEAMHUB remote-access port, which is defined as shown in FIG. 8. FIG. 6 illustrates the TEAMPANEL switching configuration for switching keyboard function of up to three TEAMMATES to the TEAMHUB keyboard and also for switching TEAMHUB keyboard signals to the TEAMMATE keyboard. As seen therein, when the switches of FIG. 6 are in their normal contact position, each of the TEAMMATEs and the TEAMHUB is connected to a corresponding individual keyboard. However, when switch S4, S5, or S6 is "ON", the TEAMHUB keyboard is connected to the keyboard signals of the CPU card corresponding to TEAMMATE 1, 2, or 3 instead of the keyboard signals from the CPU card on the TEAMHUB.

Figure 9:
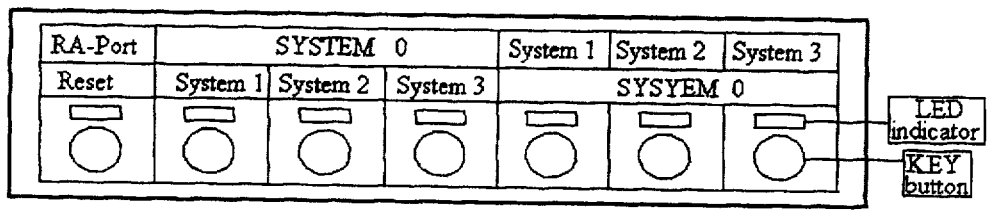
FIG. 9 is an illustration of the function keys for keyboard switching on the TEAMPANEL.

The function keys on the TEAMPANEL for remote-access port are illustrated in FIG. 9. As seen therein, normally SYSTEM0 represents TEAMHUB and SYSTEM1 to SYSTEM3 represents TEAMMATE 1 to 3, respectively. When the key button is pressed, the LED indicator is lit to show the current setting. The Reset key resets the current setting back to default setting, which means no functional switching between TEAMHUB and TEAMMATEs. SYSTEM0 to SYSTEM1 key represents SYSTEM0 remote-access port yielded to SYSTEM1 remote-access port, which also means the SYSTEM1's remote-access port controls SYSTEM0. The same functionality applies to the keys of SYSTEM0 to SYSTEM2 and SYSTEM0 to SYSTEM3. These switches are used to control the TEAMHUB from selected TEAMMATE's remote-access port, which comprises keyboard, 2 serial ports, system-disk LEd, system reset, buzzer/speaker signals. SYSTEM1 to SYSTEM0 key represent SYSTEM1'S remote-access port is yielded to SYSTEM0's remote-access port, which also means the SYSTEM0's remote-access port controls SYSTEM1. The same functionality applies to the keys of SYSTEM2 to SYSTEM0 and SYSTEM3 to SYSTEM0. These switches are used to control any of the TEAMMATEs from the TEAMHUB's remote acess port, which comprises keyboard, 2 serial ports, system-disk LED, system reset, buzzer/speaker signals.

Figure 10:
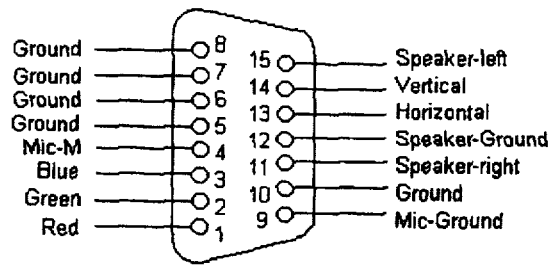
FIG. 10 is an illustration of the audio/VGA port used in the TEAMPANEL.

FIG. 7 illustrates the TEAMPANEL switching configuration for switching A/V port (audio and VGA) signals of any of the systems, whether it is TEAMHUB or TEAMMATE, onto any other system's audio speaker(s) and VGA monitor(s) and at the same time, the involved system's microphones are linked and voice can be mixed as a "telephone intercon". The A/V port signal is defined and illustrated as shown in FIG. 10.

As seen in FIG. 7, when switches A, B, C and D are in their normal contact position, each of the TEAMMATES and the TEAMHUB is connected to a corresponding individual monitor. However, switch A, B, C and D can be configured to connect from any computer to any monitor and each of switches B, C and D can be configured to connect to any of the other corresponding monitors.

Figure 11:
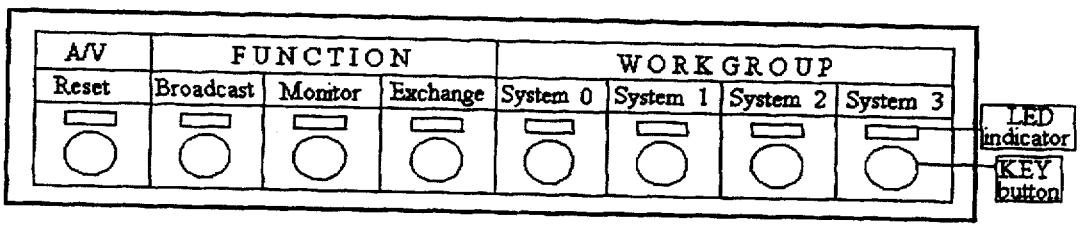
FIG. 11 is an illustration of the function keys for audio/VGA switching on the TEAMPANEL.

The function keys on the TEAMPANEL for A/V is shown in FIG. 11. As seen in FIG. 11, SYSTEM0 normally represents TEAMHUB and SYSTEM1 to SYSTEM3 represents TEAMMATE 1 to 3, respectively. When the key button is pressed, the LED indicator will be lit to show the current setting. The Reset key resets the current setting back to default setting, which means no functional switching among the systems. The command line is interpreted the same way as a sentence. A sentence consists of "the subject", "the verb", and "the object". The command consists of "the source", "the function", and "the target". For example, to execute a command sentence such as "SYSTEM0 broadcast (to) SYSTEM1". First, SYSTEM0 key button is depressed and the LED on top is lit. Then the Broadcast key button is depressed and the LED on top is lit and at the same time, the SYSTEM0's LED begins blinking. The last step is to press the SYSTEM1 key button and the LED on top is lit. "SYSTEM0 broadcast (to) SYSTEM1, SYSTEM2, SYSTEM3 follows the same procedure as above but the last step is to press SYSTEM1 key button, SYSTEM2 key button and SYSTEM3 key button altogether. The same procedure applies to "SYSTEM1 broadcast (to) SYSTEM0", "SYSTEM2 Broadcast (to) SYSTEM1 and SYSTEM3" . . . etc. Functions such as monitor and exchange can only have one target instead of multiple targets. "SYSTEM0 monitor SYSTEM1", "SYSTEM1 exchange (with) SYSTEM2" . . . etc.

When the command line is completed, the target system's monitor is displayed with the content generated by the source system, the target system's speakers are triggered by the sound generated by the source system and the target system's microphone and the source system's microphone are linked as one input signal to activate the sound card of the source system. Since the source system's and target system's monitors are all displayed with the same content and the speakers are voiced the same, a low-cost real-time audio/video conferencing can be easily achieved.

Combined TEAMPANEL for remote-access port and TEAMPANEL for A/V, System interchange and system control can be easily achieved. For example, execute the command "SYSTEM0 exchange (with) SYSTEM1" on the TEAMPANEL for A/V and press the "SYSTEM0 to SYSTEM1" key button and "SYSTEM1 to SYSTEM0 key button on the TEAMPANEL for remote-access port. Then the original TEAMHUB user controls the TEAMMATE1 system, while the original TEAMMATE1 user uses the TEAMHUB system.

FIG. 8 illustrates the pin-out definition of the remote access port of the CPU card of FIG. 4. As seen in FIG. 8, there are two serial ports, a keyboard interface, reset line, speaker lines and HDD/LED, the latter providing a remote user with an indication of operating status. From FIG. 8, it will be seen that the keyboard of the present invention is unique in that it provides two serial ports, reset, speaker and HDD/LED signal transfer in addition to standard ASCI keyboard signals.

The present invention also enables TEAMSERVER and workgrouped PCs, whether in one chassis or in multiple chassis, to upgrade existing PC-based LAN into a more productive team/workgroup-based LAN, where workgroup multimedia, workgroup collaboration, and workgroup database/application sharing can be achieved without deficiency in a enterprise-wide environment.

The present invention also enables TEAMSERVER and team/workgrouped PCs, whether in one chassis or in multiple chassis, to accommodate multiple users with a multimedia and collaborative network without resorting to an NOS in a small area, such as a typical small business office, retail store, restaurant or professional office environment, i.e., (Small Office Home Office "SOHO").

Figure 12:
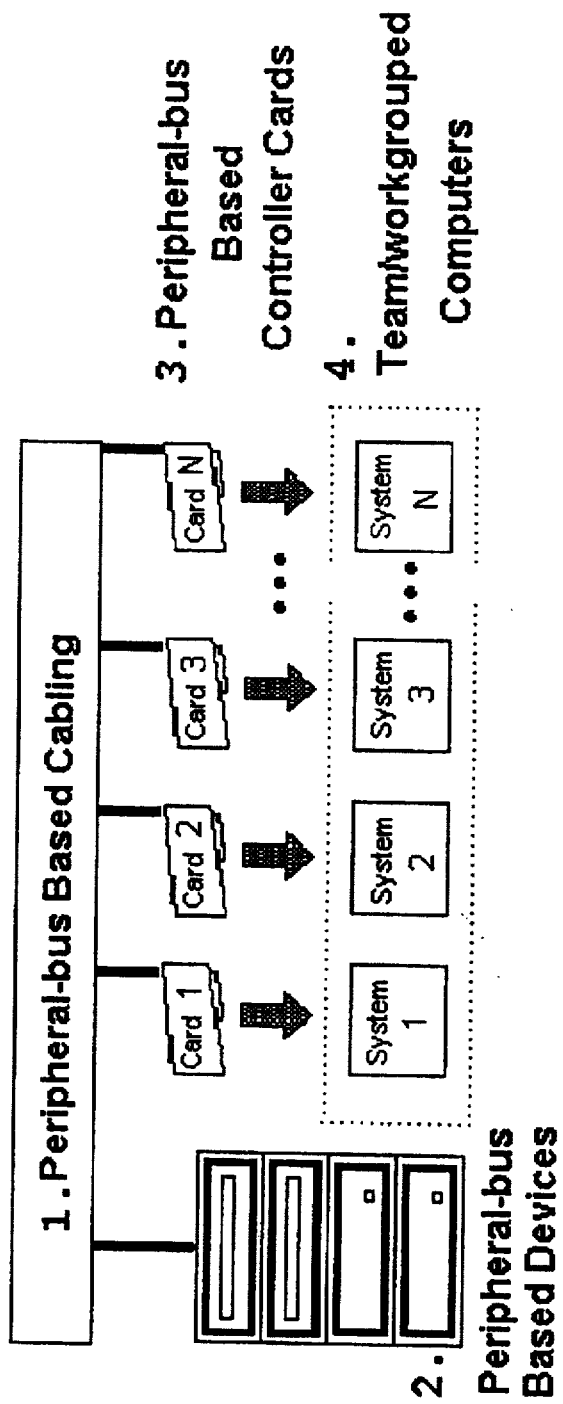
FIG. 12 is a block diagram of a typical TEAMSERVER environment in which the present invention is utilized.

The functional diagram of FIG. 12 shows a typical TEAMSERVER environment. As illustrated in FIG. 12, in a typical TEAMSERVER environment a defined peripheral-bus based cabling and connects all team/workgrouped computers and peripheral-bus based devices. In the present invention, SCSI-II is used as the defined peripheral bus. The peripheral bus can also be SCSI-3, FC-AL fiber channel arbitrated loop, SSA serial storage architecture, or IEEE P1394 known as "FireWire".

As shown in FIG. 12, peripheral-bus based controller cards are add-in expansion cards that can be plugged into the system chassis and interface with the residing operating system (such as DOS, Win95, OS/2 and the like) through expansion bus such as PCI (Peripheral Component Interconnect) or ISA (Industry Standard Architecture). Also, these controller cards are especially designed to be equipped with "TEAMBIOS" and "TEAMDEVICE" drivers. TEAMBIOS is a BIOS level system driver, residing in the ROM section of the controller card. TEAMDEVICE drivers are OS-dependent peripheral-bus device drivers, (for example, a DOS/WIN31 TeamCD-ROM device driver for SCSI CD-ROM drives and a DOS/WIN TeamHDD device driver for SCSI hard disk drives . . . etc.), usually residing on a floppy disk. They can be installed on a team/workgrouped computer under a specific OS. Together, they provide the team/workgrouped computer with the ability to recognize all connected SCSI devices during system boot-up, control the access traffic to connected SCSI devices and communicate with other controller cards in other team/workgrouped computers through locking mechanism "Semaphore" installed on one of the workgrouped computers or TEAMHUB in the TEAMPRO workgroup system.

In the present invention, an ISA-based SCSI-II controller card in a DOS/WIN31 environment is used as an example. It can also be a PCI-based SCSI-II controller card, or instead of SCSI-II, it can be SCSI-3, FC-AL fiber channel arbitrated loop, SSA serial storage architecture, or IEEE P1394 FireWire.

Figure 13:
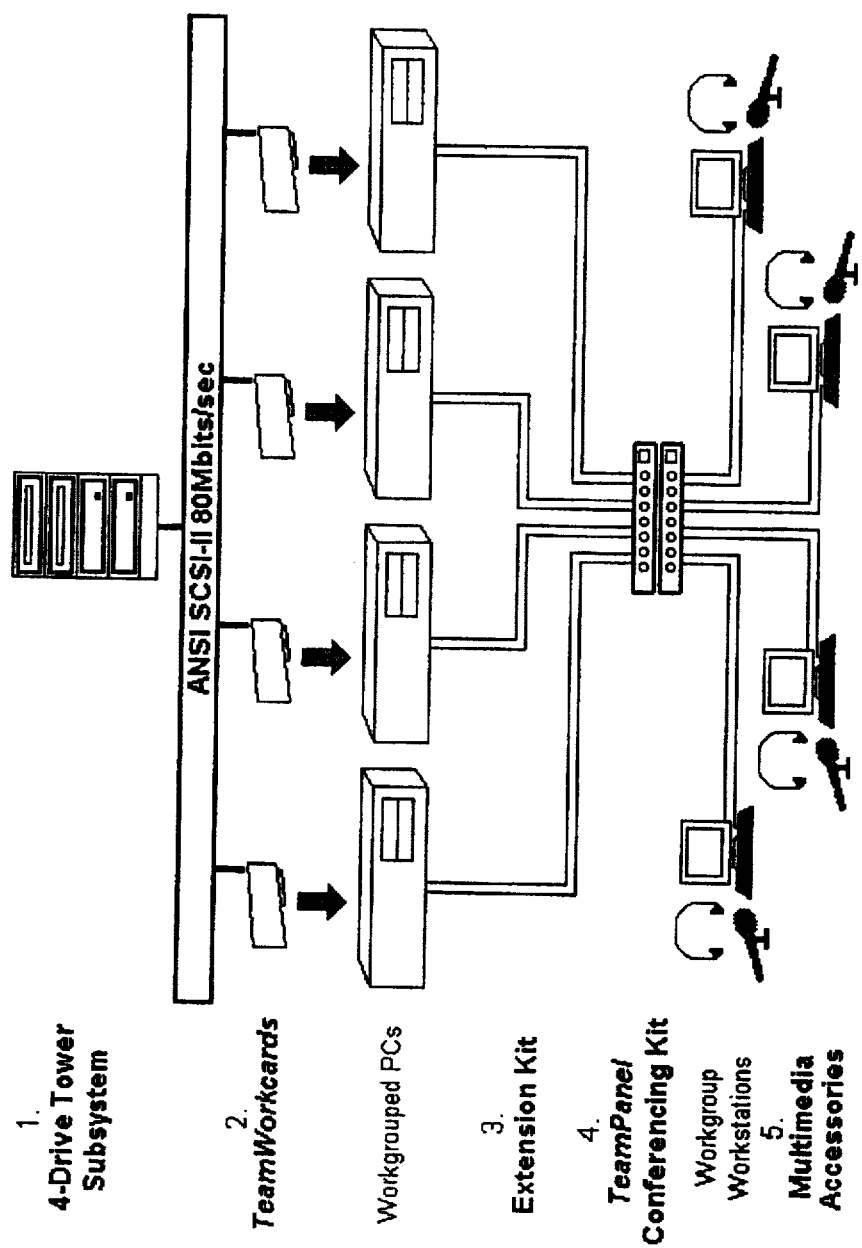
FIG. 13 is a block diagram of a TEAMSERVER hardware configuration with team/workgroup personal computers.
Figure 14:
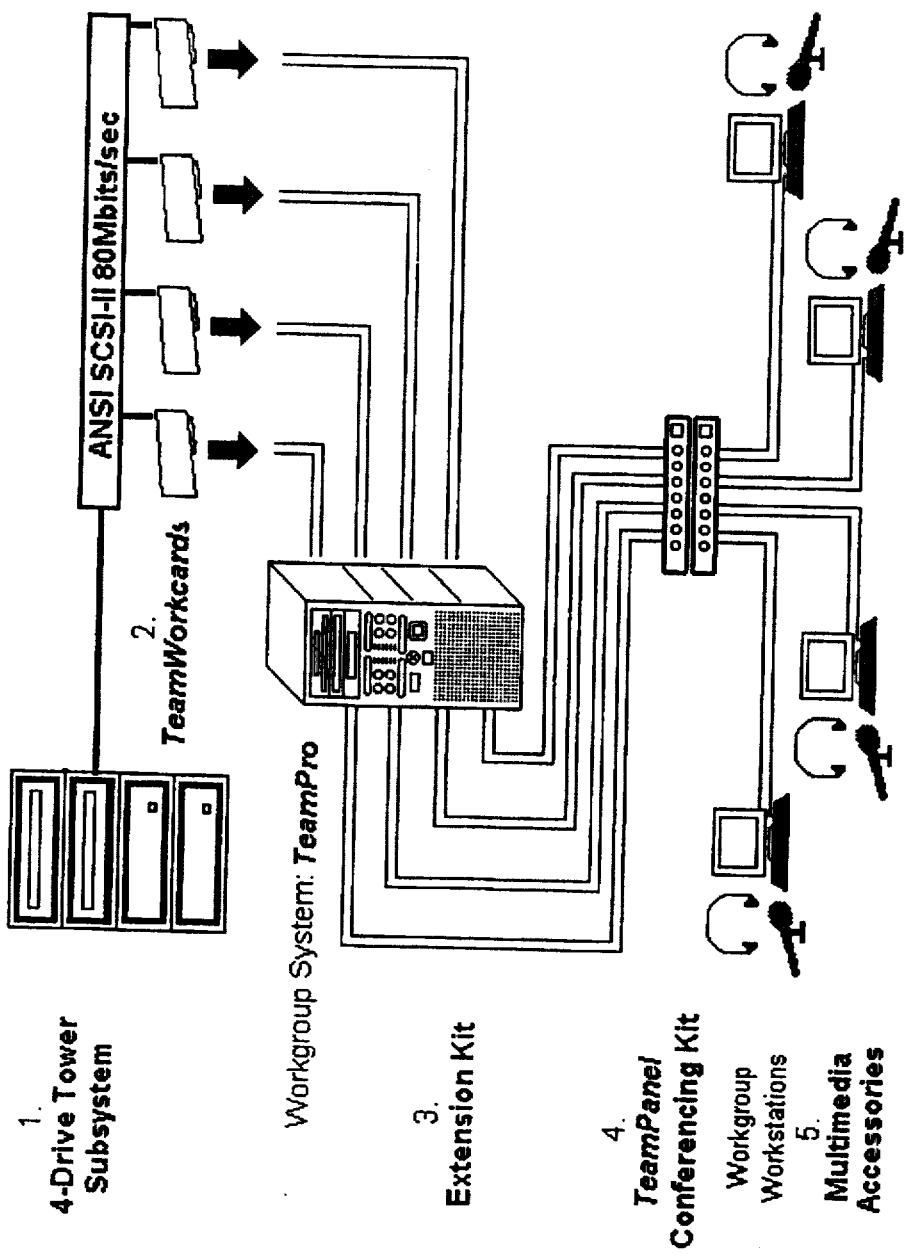
FIG. 14 is a block diagram of a combined TEAMSERVER hardware configuration with a TEAMPRO workgroup system.

There are two ways of grouping computers into collaborative workgroups: a) Team/workgrouped computers can be all housed in one chassis as defined herein as TEAMPRO; and as shown in FIG. 14; b) Team/workgrouped computers can be housed in their individual chassis, but linked with peripheral-bus-based cable as shown in FIG. 13. These systems chassis can be placed in one location, while their corresponding monitors and keyboards can be placed at other dispersed locations. By doing so, the users in this collaborative workgroup can enjoy the same benefits as TEAMPRO users can, namely, the benefits of having a noiseless working environment, of conducting a real-time audio/video workgroup conferencing thru TEAMPANEL, of promoting teamwork and group collaboration.

The number of how many team/workgrouped PCs that can be connected together depends on the peripheral-bus protocol constrain, for example, SCSI-II peripheral-bus protocol can allow only 8 ID addresses, while IEEE P1394 allows 64 ID addresses.

In the present invention, SCSI-II is used. Therefore the total number of connecting team/workgrouped PCs and SCSI devices is eight. For illustration purposes in FIG. 13 and 14, there are four team/workgrouped PCs and four SCSI-II devices, such as 2 CD-ROM drives and 2 SCSI hard drives in a collaborative team/workgroup environment.

Figure 15:
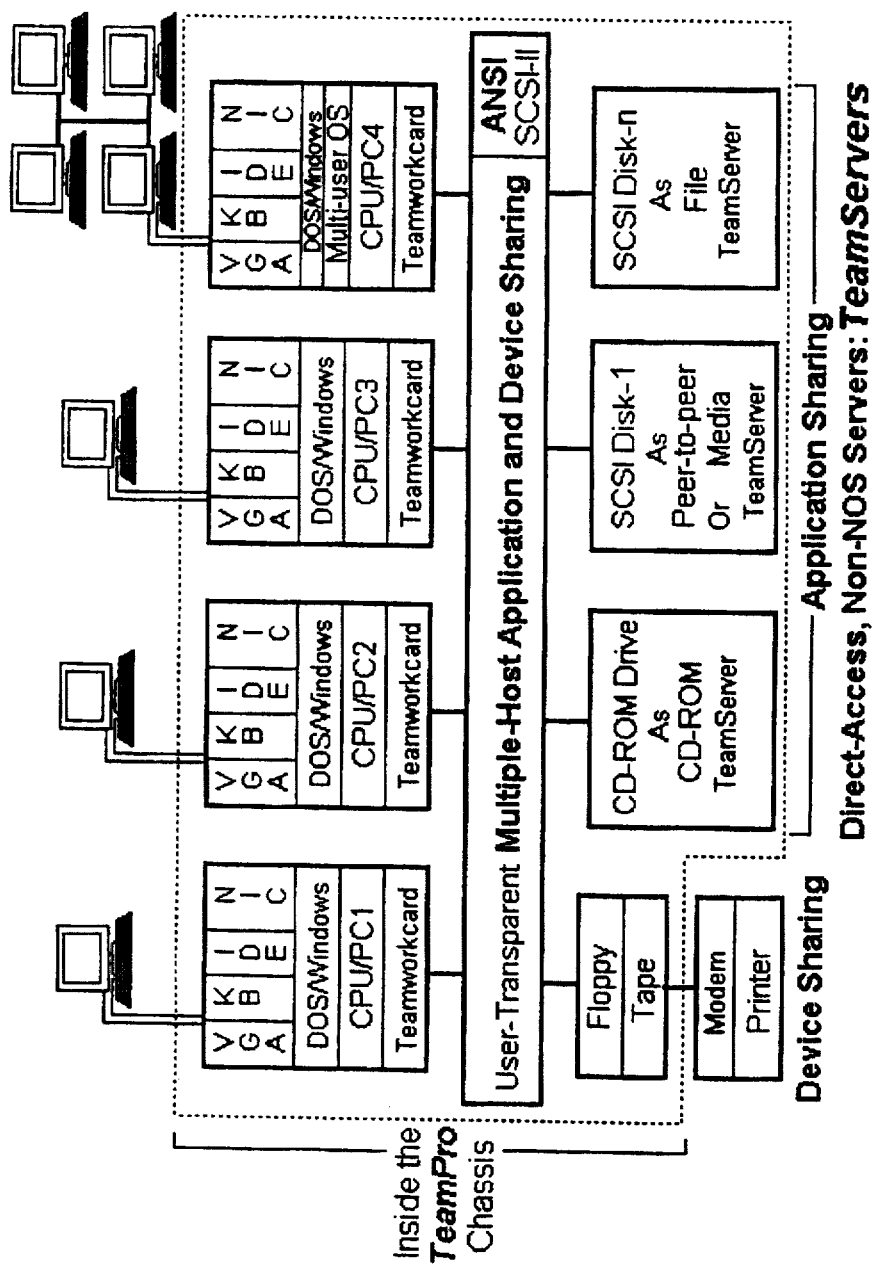
FIG. 15 is a block diagram of an illustrative hardware configuration of the present invention shown as a multi-user workgroup system for seven users having direct-access servers for multimedia and application sharing and configured as a TEAMPRO workgroup System.

FIG. 15 illustrates the present invention configured as a multi-user workgroup system. The system comprises a user-transparent, multiple-host application and device sharing capability provided by a SCSI-II interface. The interface provides device sharing to floppy and tape drives, printer and modem. The interface also provides application sharing via a CD-ROM drive as a CD-TEAM server, a SCSI disk as a peer-to-peer and media TeamServer, and SCSI disc as a file TeamServer.

CD-ROM TEAMSERVER's configuration comprises a SCSI-II TEAMWORKCARD with TEAMBIOS and DOS/WIN TEAMCD-ROM device driver for interfacing CD-ROM optical devices or its equivalents such as WORM (Write Once Read Many time optical devices), Erasable MO (Magnito-Optical devices . . . ). Every team/workgrouped PC can directly access the CD-ROM drive at the maximum speed. Every team/workgrouped PC can directly access more than one CD-ROM without affecting other workgroup systems, workgrouped PCs or the LAN server.

Media/Peer-to-Peer TEAMSERVER's configuration comprises SCSI-II TEAMWORKCARD with TEAMBIOS and DOS/WIN TEAMHDD/Peer device driver for interfacing SCSI hard disk. Every team/workgrouped PC user can direct access the SCSI disk at the maximum speed. Every team/workgrouped PC user can direct access the media disk and other's file without affecting other team/workgrouped PCs, other workgroup systems and the LAN server, providing the fault-tolerance for the team/workgroup users.

File TEAMSERVER's configuration comprises a SCSI-II TEAMWORKCARD with TEAMBIOS and DOS/WIN TEAMHDD/File device driver for interfacing SCSI hard disk. Every team/workgrouped PC can directly access the SCSI disk at the maximum speed. Team/workgroup users can create, update and share a team/workgroup database without bothering the LAN server. There is no need for a dedicated system and NOS. It is fault-tolerant and provides the fastest direct access.

The workgroup system also provides up to four CPU cards which connect to four workstations, each operating at a remote location as a stand-alone PC comprising a monitor and keyboard. Each workstation recognizes the three servers (i.e., CD-ROM server, media/peer-to-peer/read only server and file server), as direct-access local drivers during each individual system's bootup. Any of the four CPU cards may be provided with multi-user operating software to accommodate up to sixteen users. In FIG. 15, one CPU card (i.e., PC4) is shown split into four PC workstations for illustration purposes. Each of the server workstations has built-in jacks for headphones/speakers and microphone and the keyboard provides two serial ports, a reset button, a system LED and a buzzer/speaker. Each TEAMMATE computer inside the TEAMPRO chassis can provide its own disk drive (IDE) and its own Network Interface Card (NIC) for attachment to a LAN server.

Figure 16:
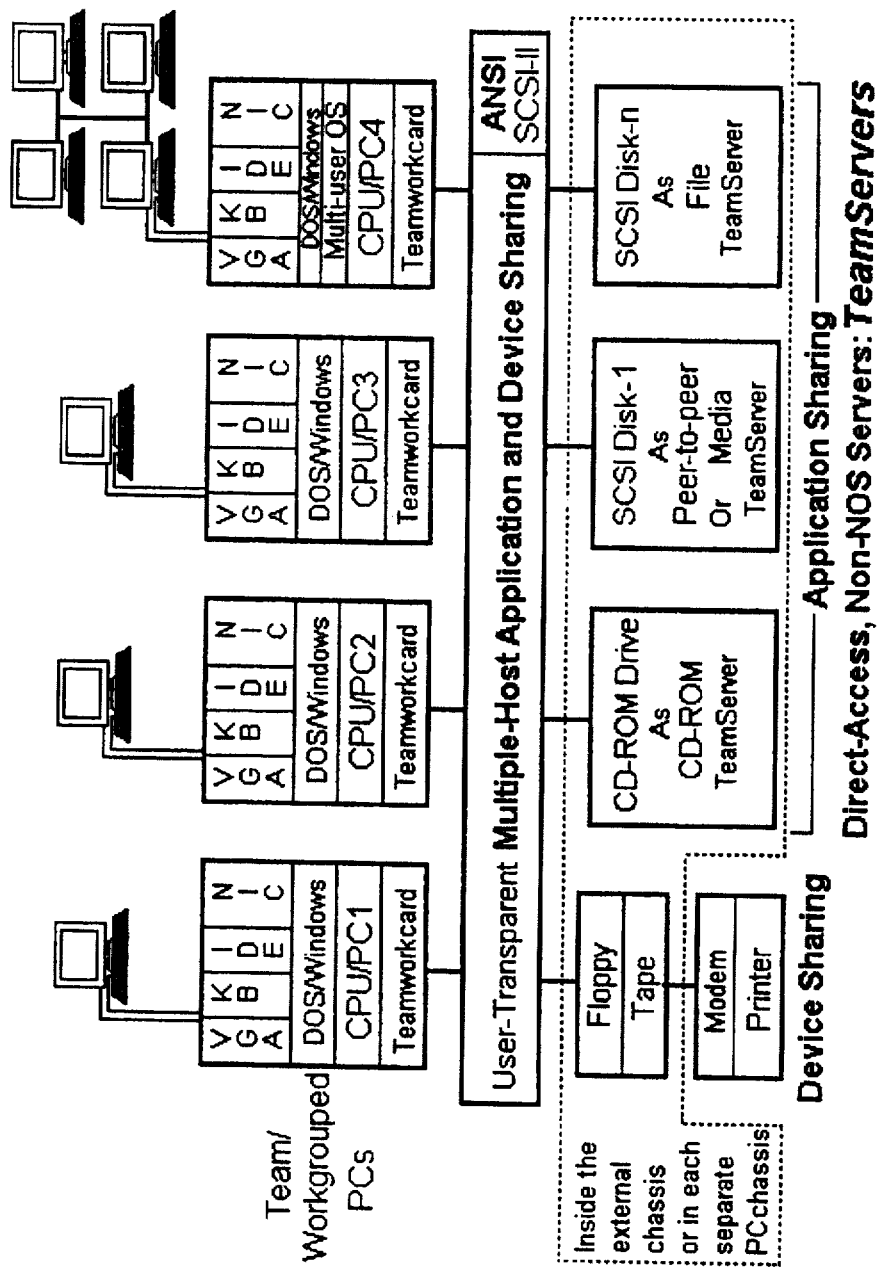
FIG. 16 is a block diagram similar to that of FIG. 15 but illustrating team/workgrouped PCs.

The TEAMSERVER of the present invention may be configured as a TEAMPRO workgroup System as shown in FIG. 15 or as Team/Workgrouped PCs as shown in FIG. 16, the latter housing the TEAMSERVERs in a separate external chassis.

In the present invention, the CD-ROM TEAMSERVER provides a higher sharing performance, enabling every team/ workgrouped PC directly access the CD-ROM drive at the maximum speed and without using a network operating system for sharing. It also provides the congenital utility advantages, allowing every team/workgrouped PC to directly access more than one CD-ROM without affecting other workgroup systems, workgrouped PCs or the LAN server.

A Media/Peer-to-peer TEAMSERVER is connected within a team/workgroup by installing, in each team/workgrouped PC, a SCSI-II TEAMWORKCARD with TEAMBIOS and a DOS/WIN TEAMHDD/Peer device driver for interfacing the SCSI hard disks.

In the present invention, the Media/Peer-to-peer provides a higher sharing performance for each team/workgrouped PC to directly access the SCSI disk at the maximum speed and without using a network operating system for sharing. It also provides the congenital utility advantages, allowing each team/workgrouped PC user to directly access the media disk for workgroup multimedia and to share other's files stored on the same SCSI disk for workgroup collaboration, without affecting other team/workgrouped PCs, other workgroup systems and the LAN server.

A file TEAMSERVER is connected within the team/workgroup by installing, in each team/workgrouped PC, a SCSI-II TEAMWORKCARD with TEAMBIOS and DOS/WIN TEAMHDD/File device driver for interfacing the SCSI hard disks.

In the present invention, the file TEAMSERVER provides better workgroup sharing performance, enabling every team/workgrouped PC to directly access the SCSI disk at the maximum speed and without using a network operating system for sharing.

It also provides the congenital utility advantages, allowing team/workgroup users to create, update and share team/workgroup database without bothering the LAN server. There is no need for a dedicated system running with a NOS to serve as a team/workgroup file server.

It is also the intention of this invention to introduce a better network architecture. Based on this new network architecture, TEAMSERVERs can mesh well with the LAN servers, creating a more powerful, efficient and productive LAN.

Figure 17:
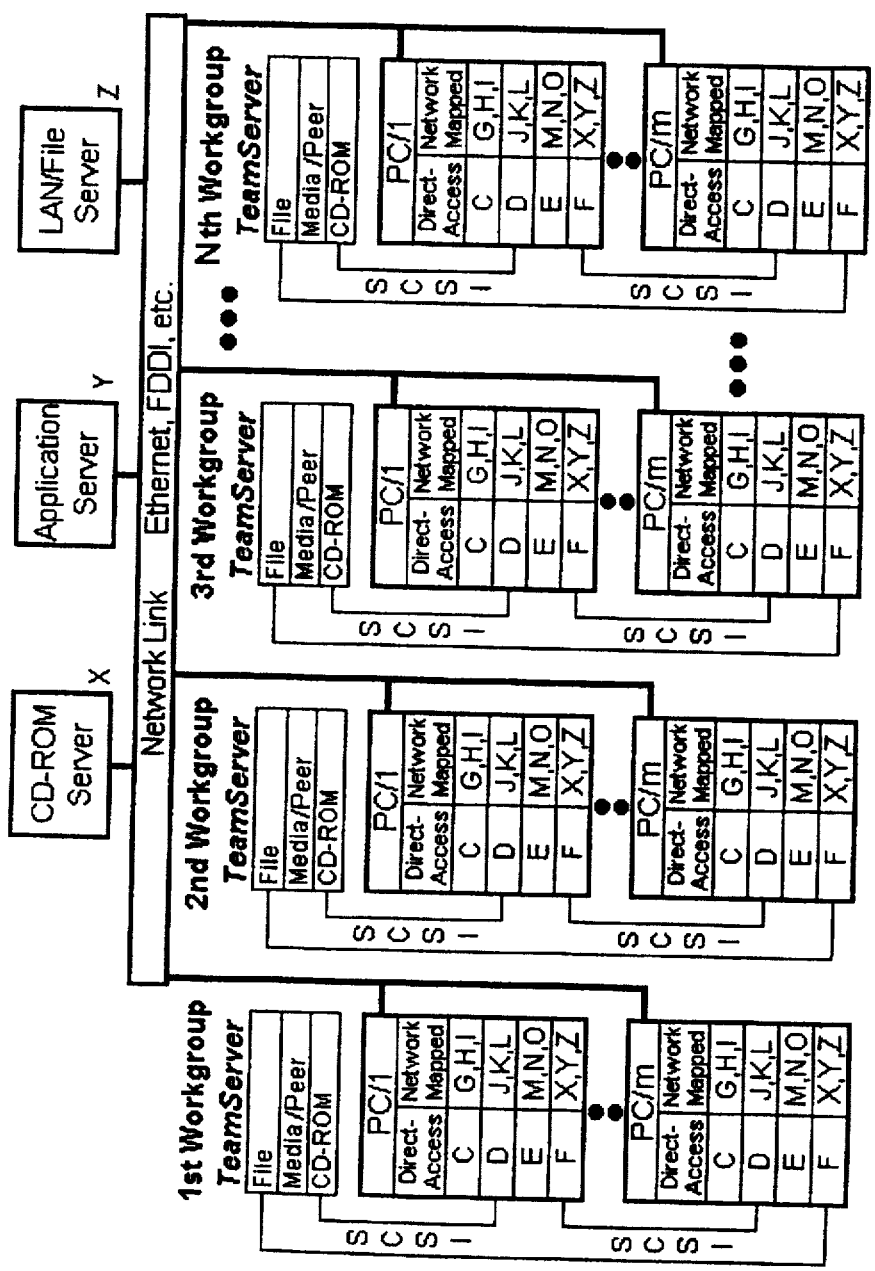
FIG. 17 is a block diagram of a multiple TEAMSERVER system controlled by a local area network (LAN) file server through a network link.

In FIG. 17, it is easy to perceive that the LAN servers are like central government agencies, while the TEAMSERVERs are like local government agencies. Certainly, if the transaction created by the individual workstation is a workgroup-related task, then it should be carried out by the local workgroup TEAMSERVER. And if the transaction is a network task, then it should be carried out by the LAN servers. In addition, TEAMSERVERs and LAN servers can function as one big server unit to the team/workgroup users. Any transaction can first be processed by the local TEAMSERVER. If the local TEAMSERVER can not satisfy the transaction, then the TEAMSERVER notifies the LAN server to retrieve the necessary information and download onto the TEAMSERVER or directly onto the requester's local drive, (i.e., the IDE drive in each computer), enabling the TEAMSERVER to satisfy the transaction generated by the team/workgroup user.

In a library, the most commonly-used multimedia materials are stored on the local team/workgroup Media TEAMSERVER, and the rest of the multimedia materials are stored on CD-ROMs or Video CDs in a juke box handled by central CD-ROM server. When a local team workgroup user requests serial multimedia materials, there is a, say 50% chance that some of the materials are stored on the local TEAMSERVER and those materials can be retrieved right away to satisfy the user's request. While the user is studying the first 50%, the other 50% stored on the CD-ROM server can then be downloaded to the Media TEAMSERVER at the same time and will be ready for the user to access when the first 50% is consumed. The goal of always providing users with the information readily available can be easily achieved on this workgroup-based LAN. Since the CD-ROM server can be a TEAMPRO workgroup system with 4 CPUs and each CPU can handle at least 4 CD-ROM drives, there are at least 16 on-line CD-ROM drives under TEAMPRO's control, generating 16 task-oriented messengers to fulfill the needs of downloading the information from the CD-ROM. By using the LAN OS, all the requests from users are sent to CD-ROM LAN servers controlled by a TEAMHUB computer. The TEAMHUB computer then dispatches the specific tasks to TEAMMATE computers through peripheral bus (i.e., SCSI-II in the present invention and not through the general network bus in order to reduce the unnecessary traffic). The TEAMMATE computers then issue the command to a robot so that the right CD-ROM can be placed in one of the CD-ROM drives. When the CD-ROM is engaged, the TEAMMATE computer retrieves the data and downloads to the designated requester's local drive or its TEAM-SERVER under the LAN OS. The whole operation can be ran smoothly on this workgroup-based LAN platform. It cannot be achieved on the PC-based LAN platform, for the LAN server alone without the local servers help cannot handle the overall requests from every workstation.

The TEAMSERVER and either team/workgrouped PCs or TEAMPRO workgroup system together provide the best way of upgrading the existing PC-based LAN into a more cost-effective and productive team/workgroup-based LAN. They are essential elements that create a better network architecture where TEAMSERVER can help LAN server to alleviate the demanding time-critical data transfer and also generate a time buffer for LAN server to complete the task. Since the TEAMSERVERS can be directly accessed by every team/workgrouped PC as local drives without using an NOS, it can easily blend in with the existing LAN server because TEAMSERVER can coexist with the LAN servers like the local IDE drive without using a bridge/router for generating NOS-to-NOS handshaking overhead and TEAM-SERVERs don't compete against the client-NOS resources resided on each workstation.

Figure 18:
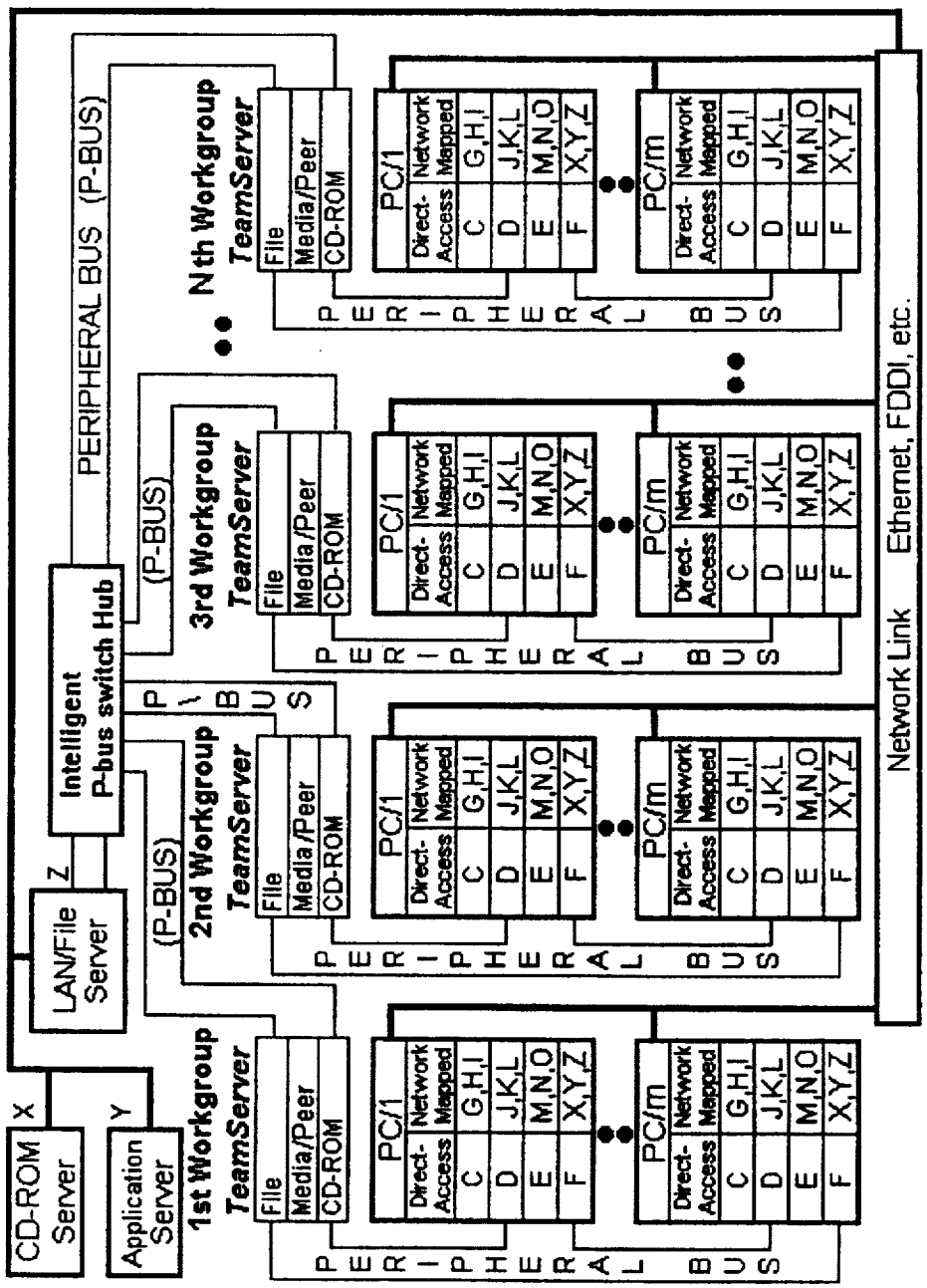
FIG. 18 is a block diagram of a multiple TEAMSERVER system controlled by a local area network file server through an intelligent P-bus switch hub.

It is also the function of this invention to provide a better workgroup-based LAN as illustrated in FIG. 18.

In FIG. 18, the TEAMSERVERs are directly accessed and controlled by the LAN file server. TEAMSERVERs will have the same disk-format recognizable by the LAN OS. When the LAN/file servers is booted up, the TEAM-SERVER can be recognized by the LAN/file server. Each TEAMSERVER can be directly accessed and updated by the local workgroup. Team/workgroup users can also directly access other workgroup's TEAMSERVER by notifying the LAN/file server. The LAN/file server decides, based on the request, which destination TEAMSERVER is to be connected and then sends the control signal to the intelligent switch hub. The intelligent switch hub receives the command and connects the requester's P-bus with the P-bus that goes to the destination TEAMSERVER. On this platform, the LAN file/server controls the TEAMSERVERS. TEAM-SERVERS are recognized as part of the LAN file server. It is the ideal platform for distributed data base operation, where local workgroup users can update the local data base, and the local data base can be accessed by other workgroups. It provides a effective, high-performance data retrieval and data transfer method in an enterprise-wide environment for the multimedia and data base applications.

Those having skill in the art to which the present invention pertains, will now as a result of the applicants' teaching herein, perceive various modifications and additions which may be made to the invention. By way of example, the precise number of multiple computers housed separately or in a unitary chassis of the present invention, as well as the manner in which circuit cards are provided to interconnect such computers, as well as to interconnect the keyboards and monitors thereof at dispersed stations relative to such computers, as well as the manner for interconnecting the multiple computer system of the present invention with a network or workgroup environment or both, may be readily altered from the exemplary preferred embodiment disclosed herein. Accordingly, all such modifications and additions which may be made to the invention are deemed to be within the scope of the claims appended hereto and their equivalents.

I claim:

1. A multiple computer system comprising:

a unitary chassis;

a plurality of CPU circuits, each such CPU circuit corresponding to a distinct computer;

a plurality of bus intercommunication circuits for data communications between said computers, each said bus intercommunication circuit corresponding to a distinct computer;

a plurality of display monitor control circuits for controlling display monitors, each such display monitor control circuit corresponding to a distinct computer;

said pluralities of CPU circuits, bus intercommunication circuits and display monitor control circuits being contained and electrically interconnected within said unitary chassis;

at least one power supply within said chassis for powering all of said circuits;

each said computer having a display monitor and a keyboard externally positioned relative to said chassis and connected to corresponding computer circuits within said chassis by associated cables;

each said CPU circuit being directly connected without a network operating system to at least one server.

2. The computer system recited in claim 1 further comprising switching means for switching to a selected one of said display monitors the signals being transmitted to any other of said display monitors.

3. The computer system recited in claim 1 further comprising switching means for switching from a selected keyboard of one said computer the signals being transmitted to any other of said computers.

4. The computer system recited in claim 1 wherein each said display monitor is electrically connected to a respective corresponding display monitor control circuit.

5. The computer system recited in claim 1 wherein each such CPU circuit comprises at least one remote access port and wherein each said keyboard is electrically connected to the remote access port of a respective corresponding CPU circuit.

6. The computer system recited in claim 1 further comprising a plurality of hard disk drives within said chassis and wherein each said CPU circuit is electrically connected to a respective corresponding hard disk drive.

7. The computer system recited in claim 1 further comprising at least one floppy disk drive within said chassis, said CPU circuits all being electrically connected to said floppy disk drive.

8. The computer system recited in claim 1 wherein each of said bus intercommunication circuits comprises a Small Computer System Interface.

9. The computer system recited in claim 1 wherein each said server is recognized as a direct-access local drive by each said CPU circuit.

10. A multiple computer system comprising:
   a plurality of CPU circuits, each such CPU circuit corresponding to a distinct computer;
   a plurality of bus intercommunication circuits for data communications between said computers, each said bus intercommunication circuit corresponding to a distinct computer;
   a plurality of display monitor control circuits for controlling display monitors, each such display monitor control circuit corresponding to a distinct computer;
   said pluralities of CPU circuits, bus intercommunication circuits and display monitor control circuits being electrically interconnected;
   at least one power supply for powering all of said circuits;
   each said computer having a display monitor and a keyboard connected to corresponding computer circuits by associated cables;
   each said CPU circuit being directly connected without a network operating system to at least one server.

11. The computer system recited in claim 10 further comprising switching means for switching to a selected one of said display monitors the signals being transmitted to any other of said display monitors.

12. The computer system recited in claim 10 further comprising switching means for switching from a selected keyboard of one said computer the signals being transmitted to any other of said computers.

13. The computer system recited in claim 10 wherein each said display monitor is electrically connected to a respective corresponding display monitor control circuit.

14. The computer system recited in claim 10 wherein each such CPU circuit comprises at least one remote access port and wherein each said keyboard is electrically connected to the remote access port of a respective corresponding CPU circuit.

15. The computer system recited in claim 10 further comprising a plurality of hard disk drives within said chassis and wherein each said CPU circuit is electrically connected to a respective corresponding hard disk drive.

16. The computer system recited in claim 10 further comprising at least one floppy disk drive within said chassis, said CPU circuits all being electrically connected to said floppy disk drive.

17. The computer system recited in claim 10 wherein each of said bus intercommunication circuits comprises a Small Computer System Interface.

18. The computer system recited in claim 10 wherein each said server is recognized as a direct-access local drive by each said CPU circuit.

* * * * *